(12) United States Patent
Eliáš et al.

(10) Patent No.: US 9,141,512 B2
(45) Date of Patent: Sep. 22, 2015

(54) SYSTEM AND METHOD FOR CLUSTER DEBUGGING

(71) Applicant: Red Hat, Inc., Raleigh, NC (US)

(72) Inventors: Filip Eliáš, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 131 days.

(21) Appl. No.: 13/899,465

(22) Filed: May 21, 2013

(65) Prior Publication Data

US 2014/0351650 A1 Nov. 27, 2014

(51) Int. Cl.
*G06F 11/36* (2006.01)

(52) U.S. Cl.
CPC .................... *G06F 11/362* (2013.01)

(58) Field of Classification Search
CPC .............. G06F 11/362; G06F 11/3636; G06F 11/0766; G06F 11/3656; G06F 11/3664; G06F 11/0709; G06F 11/0751; G06F 11/3476; G06F 11/3668; G06F 11/3672; G06F 11/3688
See application file for complete search history.

(56) References Cited

U.S. PATENT DOCUMENTS

| | | | | |
|---|---|---|---|---|
| 5,848,264 A * | 12/1998 | Baird et al. | ...................... | 703/28 |
| 6,857,084 B1 * | 2/2005 | Giles | ............................... | 714/35 |
| 7,275,238 B2 * | 9/2007 | Anaya et al. | ................... | 717/129 |
| 7,484,118 B2 | 1/2009 | Rebmann et al. | | |
| 8,234,631 B2 | 7/2012 | Greifeneder et al. | | |
| 8,250,411 B2 * | 8/2012 | Williams et al. | ................ | 714/45 |
| 8,595,561 B1 * | 11/2013 | Lu et al. | .......................... | 714/45 |
| 2005/0229160 A1 * | 10/2005 | Rothman et al. | .............. | 717/124 |
| 2008/0010544 A1 * | 1/2008 | Boyce | .............................. | 714/39 |
| 2009/0265582 A1 * | 10/2009 | Udupa et al. | .................... | 714/37 |
| 2009/0290586 A1 * | 11/2009 | Ban et al. | ....................... | 370/394 |
| 2011/0078666 A1 * | 3/2011 | Altekar | ......................... | 717/131 |
| 2013/0014086 A1 * | 1/2013 | McFadden et al. | ........... | 717/125 |
| 2014/0317602 A1 * | 10/2014 | Zuo | ............................... | 717/125 |

OTHER PUBLICATIONS

Rohit Girme, Replay Debugger for Multi Threaded Android Applications, May 2011, 78 pages.
Debugging in Coherence, Oracle® Coherence Developer's Guide Release 3.7.1, Part No. E22837-01, http://docs.oracle.com/cd/E24290_01/coh.371/e22837/gs_debug.htm, 12 pages, Sep. 2011.

(Continued)

*Primary Examiner* — Nadeem Iqbal
(74) *Attorney, Agent, or Firm* — Haynes and Boone, LLP (57) ABSTRACT

A system and method of cluster debugging includes detecting debug events occurring in one or more first virtual machines, storing debug records, each of the debug records including information associated with a respective debug event selected from the debug events and a timestamp associated with the respective debug event, merging the debug records based on information associated with each timestamp, starting one or more second virtual machines, each of the one or more second virtual machines emulating a selected one of the one or more first virtual machines, synchronizing the one or more second virtual machines, retrieving the merged debug records, and playing the merged debug records back in chronological order on the one or more second virtual machines. In some examples, the method further includes collecting clock synchronization records. In some examples, merging the debug records includes altering an order of one or more of the debug records based on the clock synchronization records.

20 Claims, 5 Drawing Sheets

(56) References Cited

OTHER PUBLICATIONS

JPROF-Java Profile, http://perfinsp.sourceforge.net/jprof.html, Feb. 28, 2013, 9 pages.

Diego Pacheco, JBoss Remote Debug and Port Configuration, http://diegopacheco.bloqspot.in/2010/12/jboss-remote-debug-and-port.html, Dec. 23, 2010, 2 pages.

Tan et al., Mochi: Visual Log-Analysis Based Tools for Debugging Hadoop (DMU-PDL-09-103) May 1, 2009, 11 pages.

* cited by examiner

SYSTEM AND METHOD FOR CLUSTER DEBUGGING

BACKGROUND

The present disclosure relates generally to computing systems, and more particularly to cluster debugging.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computing systems generally rely on one or more software components to deliver the services and information required by users and other systems. In many computing systems the one or more software components are designed to operate in a cooperative fashion among several nodes in a cluster. In some examples, one or more of the several nodes may be executing more than one of the one or more software components either in parallel and/or through the use of virtual machines. As the number of nodes in the cluster increases it may become increasingly complex to debug the one or more software components executing on each of the nodes and/or to debug the one or more software components as a whole. As the complexity of each of the one or more software components increases the complexity of the debugging is also likely to increase.

Accordingly, it would be desirable to provide improved methods and systems for debugging software components executing on a cluster of nodes.

SUMMARY

According to one embodiment, a method of cluster debugging includes detecting debug events occurring in one or more first virtual machines, storing debug records, each of the debug records including information associated with a respective debug event selected from the debug events and a timestamp associated with the respective debug event, merging the debug records based on information associated with each timestamp, starting one or more second virtual machines, each of the one or more second virtual machines emulating a selected one of the one or more first virtual machines, synchronizing the one or more second virtual machines, retrieving the merged debug records, and playing the merged debug records back in chronological order on the one or more second virtual machines.

According to another embodiment, a non-transitory machine-readable medium comprising a first plurality of machine-readable instructions which when executed by one or more processors associated with one or more computing systems are adapted to cause the one or more processors to perform a method including detecting debug events occurring in one or more first virtual machines, storing debug records, each of the debug records including information associated with a respective debug event selected from the debug events and a timestamp associated with the respective debug event, merging the debug records based on information associated with each timestamp, starting one or more second virtual machines, each of the one or more second virtual machines emulating a selected one of the one or more first virtual machines, synchronizing the one or more second virtual machines, retrieving the merged debug records, and playing the merged debug records back in chronological order on the one or more second virtual machines.

According to yet another embodiment, a system for cluster debugging includes a cluster including a plurality of nodes coupled together using a network, a database coupled to the network, and a debugging workstation coupled to the network. Each of the plurality of nodes executes one or more first virtual machines and a debugging database extension (DDE). Debug events occur in each of the one or more first virtual machines are detected. The database stores debug records. Each of the debug records includes information associated with a respective debug event selected from the debug events and a timestamp associated with the respective debug event. The stored debug records are merged based on information associated with each timestamp. The debugging workstation executes a playback module and one or more second virtual machines. Each of the one or more second virtual machines emulates a selected one of the one or more first virtual machines. The one or more second virtual machines are synchronized. The playback module retrieves the merged debug records and plays the merged debug records back in chronological order on the one or more second virtual machines.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
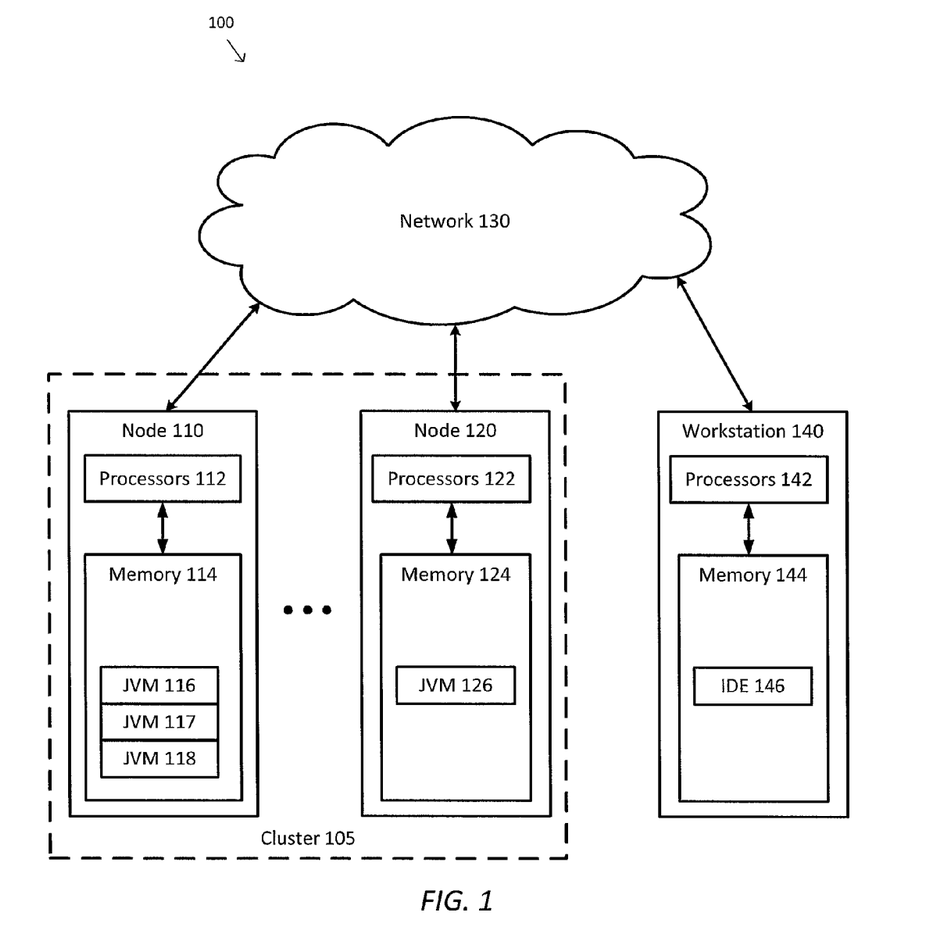
FIG. 1 is a simplified diagram of a cluster debugging system according to some examples.

FIG. 1 is a simplified diagram of a cluster debugging system 100 according to some examples. As shown in FIG. 1, cluster debugging system 100 includes a cluster 105 including a plurality of nodes. The plurality of nodes includes nodes 110 and 120. Although cluster 105 is shown with only two nodes, cluster 105 may include any number of nodes. Nodes 110 and 120 are coupled together using network 130 so that nodes 110 and 120 may execute any number of cooperating software components. The software components being executed on nodes 110 and 120 may exchange messages and/or data using network 130. Network 130 may be any kind of network. In some examples, network 130 may be an Ethernet. In some examples, network 130 may include any number of network switching devices. In some examples, network 130 may be an autonomous system. In some examples, network 130 may be an Internet.

Node 110 includes one or more processors 112 and memory 114. The one or more processors 112 are coupled to memory 114. In some examples, the one or more processors 112 may control operation and/or execution of software components on node 110. Memory 114 may be used to store any number of software components. Memory 114 may further be used to store the software components while the software components are executing. As shown in FIG. 1, memory 114 is storing Java virtual machines (JVMs) 116-118 as they are being executed on node 110. Although node 110 is shown with three JVMs being executed, any number of JVMs may be executed on node 110 as long as node 110 includes sufficient computing resources to handle them. In some examples, each of the JVMs 116-118 may be executing in separate virtual environments and/or guest operating systems on node 110.

Node 120 includes one or more processors 122 and memory 124. The one or more processors 122 are coupled to memory 124. In some examples, the one or more processors 122 may control operation and/or execution of software components on node 120. Memory 124 may be used to store any number of software components. Memory 124 may further be used to store the software components while the software components are executing. As shown in FIG. 1, memory 124 is storing a JVM 126 as it is being executed on node 120. Although node 120 is shown with only one JVM being executed, any number of JVMs may be executed on node 120 as long as node 120 includes sufficient computing resources to handle them.

JVMs 116-118 and/or 126 may be any type of virtual machines. In some examples, JVMs 116-118 and/or 126 may be part of any application server including JBoss, WebSphere, Glassfish, WildFly, and the like. In some examples, JVMs 116-118 and/or 126 may be a Cassandra JVM, Daemon JVM, a REST API JVM, and/or the like. Although JVMs 116-118 and 126 are described as Java virtual machines, it is understood that JVMs 116-118 and/or 126 may be other types of virtual machines.

Cluster debugging system 100 further includes a workstation 140. In some examples, workstation 140 may be used by a software developer and/or an operator to manage, monitor, and/or debug the software components executing on cluster 105. Workstation 140 is coupled to nodes 110 and 120 of cluster 105 using network 130. Although workstation 140 is shown as a stand-alone unit, other configurations for workstation 140 are possible. In some examples, workstation 140 may be one of the nodes of cluster 105. Workstation 140 includes one or more processors 142 and memory 144. The one or more processors 142 are coupled to memory 144. In some examples, the one or more processors 142 may control operation and/or execution of software components on workstation 140. Memory 144 may be used to store any number of software components. Memory 144 may further be used to store the software components while the software components are executing. As shown in FIG. 1, memory 144 is storing an integrated development environment (IDE) 146 as it is being executed on workstation 140. In some examples, IDE 146 may facilitate the managing, monitoring, and/or debugging of the software components executing on cluster 105. In some examples, IDE 146 may be executing in a virtual environment and/or a guest operating system on workstation 140.

Memories 114, 124, and/or 144 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
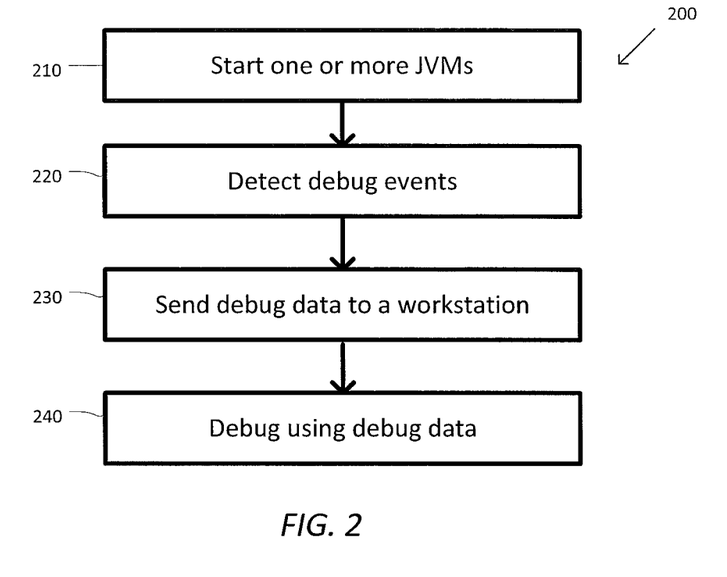
FIG. 2 is a simplified diagram of a method of cluster debugging according to some examples.

FIG. 2 is a simplified diagram of a method 200 of cluster debugging according to some examples. As shown in FIG. 2, the method 200 includes a process 210 for starting one or more JVMs, a process 220 for detecting debug events, a process 230 for sending debug data to a workstation, and a process 240 for debugging using the debug data. According to certain examples, the method 200 of cluster debugging can be performed using variations among the processes 210-240 as would be recognized by one of ordinary skill in the art. In some examples, one or more of the processes 210-240 of method 200 may be implemented, at least in part, in the form of executable code stored on non-transient, tangible, machine readable media that when run by one or more processors (e.g., the one or more processors 112, 122, and/or 142) may cause the one or more processors to perform one or more of the processes 210-240.

At the process 210, one or more JVMs are started. Before debugging of software components may begin, the software components begin execution. Each of the software components is executed in a node of a cluster. In the examples, of FIG. 2, the software components are being executed using one or more JVMs being executed on the nodes of the cluster. Each of the one or more JVMs is started so that the respective software components may begin execution. In some examples, the one or more JVMs may include the JMVs 116-118 and 126. In some examples, the cluster may be cluster 105 and the nodes may include nodes 110 and 120.

At the process 220, debug events are detected. As each of the one or more JVMs executes the software components, conditions may develop which trigger debug events. As each of the debug events is triggered, the one or more JVMs may respond to the debug events. In some examples, one or more of the debug events may be triggered by a debug rule in a corresponding JVM and/or a corresponding software component. In some examples, one or more of the debug events may be triggered when an exception is thrown. In some examples, one or more of the debug events may be triggered based on a watchpoint. In some examples, one or more of the debug events may be triggered by a breakpoint.

At the process 230, debug data is sent to a workstation. Once a debug event is triggered, the corresponding JVM may execute debug handling software in order to process the debug event. The debug handling software may collect the corresponding debug data from the corresponding JVM and/or the corresponding software component in which the debug event occurred. In some examples, the debug data may include tracing data. In some examples, the debug data may include byte codes. After the debug data is collected, it is sent to a workstation, such as workstation 140. In some examples, the debug data may be directed to an IDE, such as IDE 146. In some examples, the debug data may be sent using a message transmitted over a network, such as network 130. In some examples, the debug data may be associated with a TCP port. In some examples, the TCP port may be unique to the corresponding JVM and/or the corresponding software component.

At the process 240, the debug data is used to debug. As the debug data sent during process 230 is received at the workstation, it may be used to support debugging of the software components being executed on the cluster. In some examples, the debug data may be presented to a software developer and/or an operator to manage, monitor, and/or debug the software components. In some examples, the debug data may be logged on the workstation for later review.

According to certain examples, method 200 may be a less than ideal approach to debugging software components in a cluster. In some examples, the debug data is only assembled at the workstation in real-time and it may not be possible to temporarily stop the flow of debug data and the corresponding JVMs, which is a common debugging technique used on when debugging software components executing on a single computer. In some examples, the debug data may not be received at the workstation in a same chronological order as the respective debug events because different transmission latencies may exist between the workstation and the corresponding nodes of the cluster. In some examples, when the chronological order of the debug events is not preserved, it may reduce the effectiveness of the debugging. In some examples, method 200 may not provide an adequate record and playback module. In some examples, even though the debug data may be logged, it may not be possible to replay the logged data to debug the cluster because the logged debug data is separated from the JVM which generated it. Accordingly, improved cluster debugging systems would be desirable.

Figure 3:
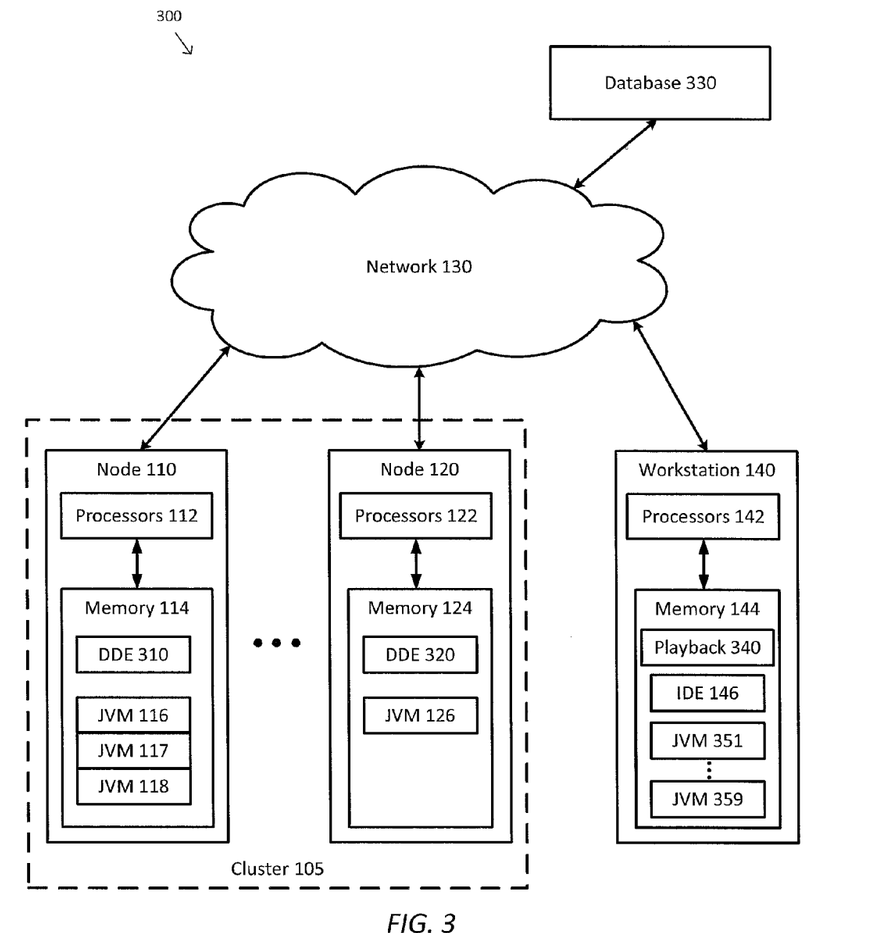
FIG. 3 is a simplified diagram of a cluster debugging system according to some examples.

FIG. 3 is a simplified diagram of a cluster debugging system 300 according to some examples. As shown in FIG. 3, cluster debugging system 300 is an enhanced version of cluster debugging system 100 of FIG. 1. Custer debugging system 300 includes cluster 105. Cluster 105 includes a plurality of nodes, including nodes 110 and 120, which are coupled together using network 130. Cluster debugging system 300 further includes workstation 140. Similar to cluster debugging system 100, node 110 is executing JVMs 116-118 and node 120 is executing JVM 126. In contrast, in cluster debugging system 300, node 110 is further executing a debugging database extension (DDE) 310 and node 120 is further executing a DDE 320. Although only one DDE is shown for each node 310 and 320, in some examples, each JVM may include its own DDE.

DDEs 310 and/or 320 may be used to enhance the collection of debug data before it is sent to workstation 140. In some examples, as the DDEs 310 and 320 collect the debug data associated with debug events, DDEs 310 and 320 may tag and/or associate the debug data with a timestamp including when the debug event occurred. In some examples, DDEs 310 and 320 may also tag and/or associate the debug data with a JVM identifier of the JVM on which the corresponding debug event occurred. In some examples, DDEs 310 and 320 may further generate and store synchronization records to address clock synchronization and clock skew issues between nodes 110 and 120.

Cluster debugging system 300 further includes a database 330. In some examples, database 330 may be coupled to nodes 110 and/or 120 using network 130. Database 330 may be used to store the debug data collected by DDEs 310 and 320. In some examples, database 330 may be used to store debug records including the debug data for debug events, the timestamp associated with the debug data, and/or the JVM identifier of the JVM associated with the debug data. In some examples, DDEs 310 and 320 may transmit the debug records to database 330 as they are generated. In some examples, database 330 may store the debug records after the debug records are collected from DDEs 310 and 320. In some examples, the debug records may be stored in database 330 using database transactions. In some examples, DDEs 310 and 320 may each include a transactor for database 330. In some examples, database 330 may store the debug records as key-value pairs. In some examples, a key portion of each key-value pair may include a timestamp and/or a JVM identifier. In some examples, the timestamp may correspond to the timestamp associated with the debug data. In some examples, the JVM identifier may identify the JVM associated with the debug data. In some examples, a value portion of each key-value pair may include the collected debug data. In some examples, the debug data may include byte codes. In some examples, database 330 may be a NoSQL database. In some examples, database 330 may be a Datomic database. In some examples, database 330 may index the debug records based on timestamps. In some examples, database 330 may further store synchronization records.

Although database 330 is shown separately in FIG. 3, database 330 may be hosted on any suitable device in cluster debugging system 300. In some examples, database 330 may be hosted on a server. In some examples, database 330 may be hosted on workstation 140. In some examples, database 330 may be hosted on any one of the nodes in the cluster, including node 110 and/or node 120. In some examples, database 330 may be distributed across multiple nodes, workstations, and/or servers.

Figure 4:
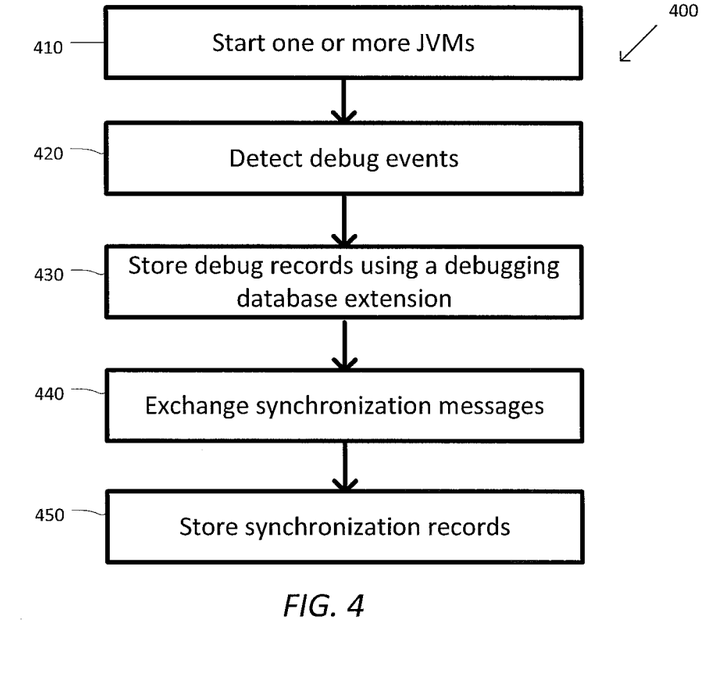
FIG. 4 is a simplified diagram of a method of collecting debug data for a cluster node according to some examples.

FIG. 4 is a simplified diagram of a method 400 of collecting debug data for a cluster node according to some examples. As shown in FIG. 4, the method 400 includes a process 410 for starting one or more JVMs, a process 420 for detecting debug events, a process 430 for storing debug records using a debugging database extension; a process 440 for exchanging synchronization messages, and a process 450 for storing synchronization records. According to certain examples, the method 400 of collecting debug data for a cluster node can be performed using variations among the processes 410-450 as would be recognized by one of ordinary skill in the art. In some examples, one or more of the processes 410-450 of method 400 may be implemented, at least in part, in the form of executable code stored on non-transient, tangible, machine readable media that when run by one or more processors (e.g., the one or more processors 112 and/or 122) may cause the one or more processors to perform one or more of the processes 410-450.

At the process 410, one or more JVMs are started. Before debugging of software components may begin, the software components begin execution. Each of the software components is executed in a node of a cluster. In the examples, of FIG. 4, the software components are being executed using one or more JVMs being executed on the node of the cluster. Each of the one or more JVMs is started so that the respective software components may begin execution. In some examples, the one or more JVMs may include the JMVs 116-118 and/or 126. In some examples, the cluster may be cluster 105 and the node be node 110 and/or 120.

At the process 420, debug events are detected. As each of the one or more JVMs executes the software components, conditions may develop which trigger debug events. As each of the debug events is triggered, the one or more JVMs may respond to the debug events. In some examples, one or more of the debug events may be triggered by a debug rule in a corresponding JVM and/or a corresponding software component. In some examples, one or more of the debug events may be triggered when an exception is thrown. In some examples, one or more of the debug events may be triggered based on a watchpoint. In some examples, one or more of the debug events may be triggered by a breakpoint. In some examples, a timestamp associated with when the debug event occurred may be recorded and/or associated with the debug event. In some examples, a JVM identifier associated the JVM on which the debug event occurred may be recorded and/or associated with the debug event.

At the process 430, debug records are stored using a debugging database extension. Once a debug event is triggered, the corresponding JVM may execute debug handling software in order to process the debug event. The debug handling software may collect the corresponding debug data from the corresponding JVM and/or the corresponding software component in which the debug event occurred. In some examples, the debug data may include tracing data. In some examples, the debug data may include byte codes. The debug data for a debug event may be used to form a debug record. In some examples, the debug record may include the debug data. In some examples, the debug record may include the timestamp associated with the debug event. In some examples, the debug record may include the JVM identifier associated with the debug event. In some examples, the debug data may be associated with a TCP port. In some examples, the TCP port may be unique to the corresponding JVM and/or the corresponding software component.

In some examples, the debug handling software may use the debugging database extension (DDE) on the node to record and/or store each debug record. In some examples, the debug records may be stored locally in the node for later collection. In some examples, the debug records may be stored in a shared database, such as database 330. In some examples, the DDE may be DDE 310 and/or DDE 320.

At the process 440, synchronization messages are exchanged. In some examples, cluster-based computer systems may often suffer from clock synchronization issues and/or clock skew between the nodes in the cluster. In some examples, differences in timing between clocks of the nodes of the cluster may exist. In some examples, the differences may affect a relative accuracy between the timestamps of debug events recorded in different nodes. In some examples, when the differences are significant enough, the timestamps of two debug events may erroneously reverse a relative order in which the two debug events occurred. In some examples, this may not be desirable. In some examples, in order to address clock synchronization and/or clock skew, the nodes in the cluster may exchange synchronization messages to minimize any effects due to clock synchronization issues and/or clock skew.

Figure 5:
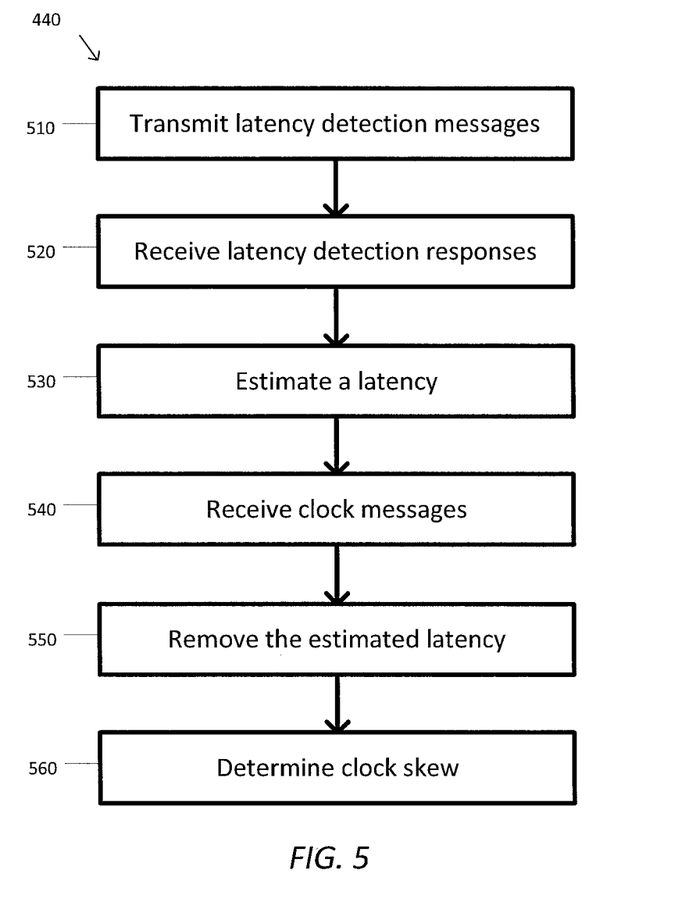
FIG. 5 is a simplified diagram of a process for exchanging clock synchronization messages according to some examples.

FIG. 5 is a simplified diagram of the process 440 for exchanging clock synchronization messages according to some examples. As shown in FIG. 5, the process 440 includes a process 510 for transmitting latency detection messages, a process 520 for receiving latency detect responses, a process 530 for estimating a latency, a process 540 for receiving clock messages, a process 550 for removing the estimated latency, and a process 560 for determining clock skew. According to certain examples, the process 440 for exchanging clock synchronization messages can be performed using variations among the processes 510-560 as would be recognized by one of ordinary skill in the art. In some examples, one or more of the processes 510-560 of process 440 may be implemented, at least in part, in the form of executable code stored on non-transient, tangible, machine readable media that when run by one or more processors (e.g., the one or more processors 112 and/or 122) may cause the one or more processors to perform one or more of the processes 510-560.

At the process 510, latency detection messages are transmitted. In some examples, as part of a clock synchronization process, two nodes in a cluster may exchange messages that include information regarding clocks of the two nodes. In some examples, latency may exist between a first time at which a message is generated at a first node and a second time at which the message is received at a second node. In some examples, a difference between the first time and the second time is the latency and/or a delay due to practical transmission characteristics. In some examples, when the first node and the second node are separated by a distance in network terms (e.g., by network 330), the latency may be significant. In some examples, the latency may be estimated by exchanging messages. In some examples, the first node may begin measurement of the latency by transmitting one or more latency detection messages to the second node. In some examples, the one or more latency detection messages may include a first timestamp associated with when the respective latency detection message is transmitted by the first node. In some examples, the first node may record the first timestamp without including the timestamp in the latency detection message. In some examples, the latency detection message may be a ping message. In some examples, the latency detection message may be an echo request.

At the process 520, latency detection responses are received. In response to the latency detection messages transmitted by the first node during process 510 to the second node, the second node may return a latency detection response. In some examples, the latency detection response may include a second timestamp associated with when the second node received the corresponding latency detection message. In some examples, the latency detection response may include a third timestamp associated with when the second node transmits the latency detection response. In some examples, the first node may record a fourth timestamp associated with when the first node receives the latency detection response. In some examples, the latency detection response may be a ping response message. In some examples, the latency response message may be an echo response.

At the process 530, a latency is estimated. By examining the first, second, third, and fourth timestamps the latency of messages between the first node and the second node may be estimated. In some examples, a difference between the first timestamp and the fourth timestamp may estimate twice the latency of messages between the first node and the second node. In some examples, a difference between the first timestamp and the second timestamp may estimate the latency of messages transmitted from the first node to the second node. In some examples, a difference between the third timestamp and the fourth timestamp may estimate the latency of messages transmitted from the second node to the first node. In some examples, other combinations of the first, second, third, and fourth timestamps may be used to estimate the latency. In some examples, timestamps associated with multiple pairs of latency detection messages and latency responses may be aggregated to more accurately estimate the latency. In some examples, the aggregation may involve averaging.

At the process 540, clock messages are received. In some examples, as part of clock synchronization, nodes in the cluster may exchange clock messages. In some examples, the clock messages each include a current time of a clock in a node (e.g., the second node) that is transmitting the respective clock message. In some examples, the current time includes a timestamp for the second node. In some examples, the clock messages may be latency detection messages and/or latency detection responses.

At the process 550, the estimated latency is removed. In some examples, the clock messages received during process 540 may be received at the first node after some latency from the second node. In some examples, the latency indicates that a current time at the first node may not be the same as the current time reported for the second node in the clock message. In some examples, any difference between the current time of the first node and the reported current time of the second node may be adjusted by removing the estimated latency. In some examples, the estimated latency may be added to the reported current time of the second node. In some examples, the estimated latency may be subtracted from the current time of the first node.

At the process 560, clock skew is determined. By comparing the current time at the first node to the reported current time of the second node after accounting for estimated latency, an estimate of the clock skew between the first node and the second node may be determined. In some examples, the clock skew between the first node and the second node may be determined using Equation 1, where $TS_1$ is a timestamp associated with when the clock message was received during process 540 by the first node, $TS_2$ is a timestamp associated with the current time reported for the second node in the clock message, and EL is the estimated latency determined during process 530.

$$\text{Clock skew} = TS_1 - TS_2 - EL \qquad \text{Eqn. 1}$$

In some examples, when the clock skew is zero, the clock of the first node and the clock of the second node are synchronized. In some examples, when the clock skew is negative, the clock of the second node may be skewed ahead of the clock of the first node. In some examples, when the clock skew is positive, the clock of the first node may be skewed ahead of the clock of the second node. In some examples, the clock skew may be used to determine a correct chronological ordering of the debug records stored during process 430. In some examples, the clock skew may be used to adjust one or more timestamps associated with debug records for the first node and/or the second node.

Referring back to FIG. 4, at the process 450, synchronization records are stored. The clock skew determined during process 560 may be stored in a synchronization record. In some examples, the synchronization record may be associated with a timestamp based on when the clock skew is determined. In some examples, the association of the timestamp with the clock skew may address any drift that occurs in the clock skew. In some examples, the synchronization record may be associated with the first node and the second node. In some examples, the synchronization record may be stored in the first node. In some examples, the synchronization record may be stored in a database. In some examples, the database may be database 330.

Referring back to 3, cluster debugging system 300 further includes workstation 140. In some examples, workstation 140 may be used by a software developer and/or an operator to manage, monitor, and/or debug the software components executing on cluster 105. Memory 144 may be used to store any number of software components. Memory 144 may further be used to store the software components while the software components are executing. As shown in FIG. 3, memory 144 is storing an integrated development environment (IDE) 146 as it is being executed on workstation 140. Memory 144 is also storing a playback module 340 and one or more JVMs 351-359.

Playback module 340 may be used within workstation 140 to load and playback debug records associated with cluster 105. In some examples, playback module 340 may playback the debug records in a same chronological order in which the corresponding debug events occurred in JVMs 116-188 and 126 in cluster 105. In some examples, the debug records may include the debug records stored in database 330. In some examples, the debug records may be associated with the debug events detected and/or recorded by DDEs 310 and 320. In some examples, playback module 340 may coordinate with IDE 146 to facilitate debugging of the software components being executed in cluster 105.

In some examples, in order to better simulate the environment of cluster 105, JVMs 351-359 may each be used to emulate JVMs 116-118 and/or 126. In some examples, each one of the JVMs 351-359 may be used to emulate a respective one of JVMs 116-118 and 126. As an example, JVM 351 may emulate JVM 116, JVM 352 may emulate JVM 117, JVM 353 may emulate JVM 118, and JVM 354 may emulate JVM 126. In some examples, each of the JVMs 351-359 may be of the same type as the respective one of the JVMs 116-118 and 126. In some examples, by emulating each of the JVMs 116-118 and 126 separately, playback module 340 may be able to playback the debug records in the emulated NM 351-359 that corresponds to the JVM 116-118 or 126 in which the corresponding debug event occurred.

Figure 6:
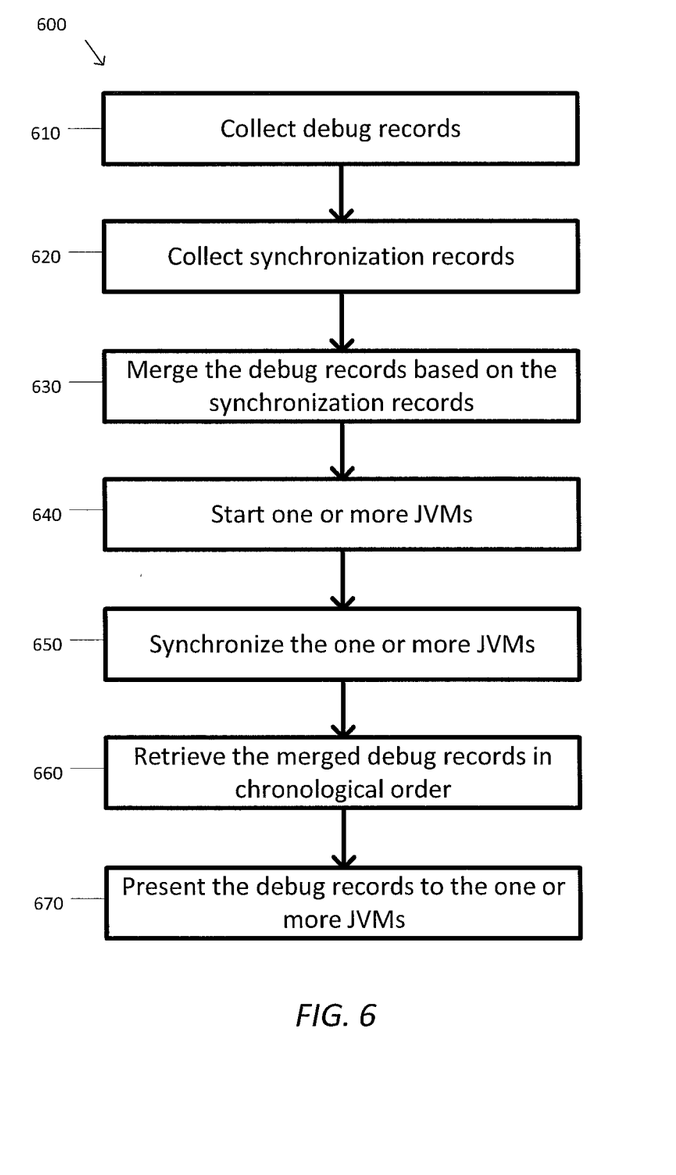
FIG. 6 is a simplified diagram of a method of cluster debugging according to some examples.

FIG. 6 is a simplified diagram of a method 600 of cluster debugging according to some examples. As shown in FIG. 6, the method 600 includes a process 610 for collecting debug records, a process 620 for collecting synchronization records, a process 630 for merging the debug records based on the synchronization records, a process 640 for starting one or more JVMs, a process 650 for synchronizing the one or more JVMs, a process 660 for retrieving the merged debug records in chronological order, and a process 670 for presenting the debug records to the one or more JVMs. According to certain examples, the method 600 of cluster debugging can be performed using variations among the processes 610-670 as would be recognized by one of ordinary skill in the art. In some examples, one or more of the processes 610-670 of method 600 may be implemented, at least in part, in the form of executable code stored on non-transient, tangible, machine readable media that when run by one or more processors (e.g., the one or more processors 142) may cause the one or more processors to perform one or more of the processes 610-670.

At the process 610, debug records are collected. Debug records corresponding to debug events are collected for use during debugging. In some examples, the debug events may be debug events that occurred in JVMs executing on one or more nodes in a cluster. In some examples, the debug events may be the debug events detected during process 420 and stored during process 430. In some examples, the JVMs may be the JVMs 116-118 and/or 126 and the one or more nodes may include nodes 110 and 120. In some examples, the debug records may be collected from DDEs in each of the nodes, such as DDEs 310 and/or 320. In some examples, the debug records may be collected from a database, such as database 330. In some examples, each of the debug records may include a timestamp corresponding to when the respective debug event occurred. In some examples, the debug records may include a JVM identifier corresponding to the JVM on which the respective debug event occurred.

At the process 620, synchronization records are collected. Synchronization records corresponding to differences in clock synchronization and/or clock skew between the one or more nodes in the cluster are collected to help ensure that a chronological order of the collected debug records may be correctly determined. In some examples, each of the synchronization records may include a clock skew between two of the nodes in the cluster. In some examples, the synchronization records may further include a synchronization timestamp corresponding to when the respective clock skew was determined. In some examples, the synchronization records may be the synchronization records stored during process 450. In some examples, the synchronization records may be collected from the one or more nodes of the cluster. In some examples, the synchronization records may be collected from a database, such as database 330.

At the process 630, the debug records are merged based on the synchronization records. In some examples, because each of the timestamps included in the debug records may correspond to a time on a respective node, there may be relative differences in a first time base associated with a first node and a second time base associated with a second node due to clock skew between the first node and the second node. In some examples, it may be important to account for the differences in the first and second time bases as it may indicate that even though a first timestamp for a first debug event from the first node is earlier than a second timestamp for a second debug event from the second node, the second debug event may have occurred before the first debug event. As the debug records collected during process 610 are merged, the timestamps included in the debug records may be adjusted by the clock skew included in the synchronization records collected during process 620. In some examples, when the first timestamp is within a clock skew threshold of the second timestamp, a clock skew in a synchronization record associated with the first node and the second node may be used to adjust the first timestamp or the second timestamp. In some examples, the synchronization record used to adjust the corresponding timestamp may further be selected based on a synchronization timestamp included in the synchronization record that is closest to the first timestamp and/or the second timestamp. In this way the clock skew used may be the clock skew measurement determined at a time closest to the first timestamp and/or the second timestamp.

At the process 640, one or more JVMs are started. One or more JVMs are started which correspond to each JVM that was being executed in the cluster from which debug records are collected. In some examples, the one or more JVMs are the JVMs 351-359. In some examples, each of the one or more JVMs may emulate the corresponding JVM that was being executed in the cluster. In some examples, each of the one or more JVMs may be of a same type as the corresponding JVM that was being executed in the cluster. In some examples, each of the one or more JVMs may be configured with a separate TCP port for receiving debug information. In some examples, the one or more JVMs may be started in conjunction with an IDE, such as IDE 146.

At the process 650, the one or more JVMs are synchronized. The one or more JVMs are synchronized so that they may be cooperatively controlled by the IDE. In some examples, the IDE may be used to start each of the one or more JVMs in synchronization. In some examples, the IDE may be used to stop each of the one or more JVMs at a same time. In some examples, each of the one or more JVMs may be synchronized by starting each of the one or more JVMs during process 640 with the switch "suspend=y".

At the process 660, the merged debug records are retrieved in chronological order. In order to support playback of the debug events recorded using method 400, each of the corresponding merged debug records are retrieved in chronological order. In some examples, the chronological order may be determined from the timestamps included in the debug records as adjusted during process 630 by the synchronization records. In some examples, the merged debug records may be retrieved from a database, such as database 330. In some examples, the merged debug records may be retrieved by a playback module, such as playback module 340.

At the process 670, the debug records are presented to the one or more JVMs. To complete the playback of the debug events, each of the debug events in the debug records is played back on a corresponding one of the one or more JVMs. In some examples, the corresponding one of the one or more JVMs may be determined based on a JVM identifier in the respective debug record. In some examples, the debug events may be played back on the corresponding JVM at a playback time that may be approximately equivalent to when the original debug event occurred in the cluster as indicated by a timestamp included in the respective debug record. In some examples, the respective debug record may include byte codes for playback in the corresponding one of the one or more JVMs. In some examples, the debug event may be presented to the corresponding one of the one or more JVMs using the TCP port assigned to the corresponding one of the one or more JVMs. In some examples, the TCP port may be identified based on the JVM identifier associated with the corresponding one of the one or more JVMs.

According to certain examples, the cluster debugging of methods 400 and 600 may provide advantages over the cluster debugging of method 200. In some examples, the recording of method 400 may support repeated playback using method 600. In some examples, the recording of method 400 may support playback using method 600 that may not need to occur in real-time, thus providing a more robust debugging environment. In some examples, the merging of clock synchronization records with the debug records may help ensure a correct chronology of the debug events during playback.

Some examples of nodes 110 and/or 120 and/or workstation 140 may include non-transient, tangible, machine readable media that include executable code that when run by one or more processors (e.g., one or more processor 112, 122, and/or 142) may cause the one or more processors to perform the processes of methods 200, 400, and/or 600 as described above. Some common forms of machine readable media that may include the processes of methods 200, 400, and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of cluster debugging, the method comprising:
    detecting debug events occurring in one or more first virtual machines;
    storing debug records, each of the debug records including information associated with a respective debug event selected from the debug events and a timestamp associated with the respective debug event;
    merging the debug records based on information associated with each timestamp;
    starting one or more second virtual machines, each of the one or more second virtual machines emulating a selected one of the one or more first virtual machines;
    synchronizing the one or more second virtual machines;
    retrieving the merged debug records; and
    playing the merged debug records back in chronological order on the one or more second virtual machines.

2. The method of claim 1 wherein each debug record further includes a virtual machine identifier associated with a respective virtual machine selected from the one or more first virtual machines in which the respective debug event occurred; and wherein playing the merged debug records back comprises playing the merged debug records back based on the virtual machine identifier included in each of the debug records.

3. The method of claim 2 wherein the virtual machine identifier identifies a TCP port associated with a corresponding one of the one or more second virtual machines.

4. The method of claim 1 wherein storing the debug records comprises storing the debug records in a database.

5. The method of claim 4 wherein the database is a Datomic database.

6. The method of claim 1 wherein the one or more first virtual machines include one or more third virtual machines executing on a first node of a cluster and one or more fourth virtual machines executing on a second node of the cluster.

7. The method of claim 6 wherein storing the debug records comprises storing the debug records associated with debug events occurring in the one or more third virtual machines using a first debugging database extension (DDE) and storing the debug records associated with debug events occurring in the one or more fourth virtual machines using a second DDE.

8. The method of claim 7 wherein the first DDE includes a database transactor.

9. The method of claim 6, further comprising collecting clock synchronization records associated with the first node and the second node.

10. The method of claim 9 wherein collecting clock synchronization records comprises:
    transmitting a latency detection message from the first node to the second node;
    transmitting a latency detection response from the second node to the first node;
    determining a latency between the first node and the second node based on information associated with the latency detection message and the latency detection response;
    transmitting a clock message from the second node to the first node;
    determining a clock skew between the first node and the second node based on information associated with the latency and the clock message; and
    forming one of the clock synchronization records based on information associated with the clock skew.

11. The method of claim 10 wherein the latency detection message is a ping message or an echo request message.

12. The method of claim 10 wherein the clock message is the latency detection response.

13. The method of claim 9 wherein each of the clock synchronization records includes a timestamp associated with either the first node or the second node.

14. The method of claim 9 wherein merging the debug records comprises altering an order of one or more of the debug records based on information associated with the clock synchronization records.

15. The method of claim 1 wherein the one or more first virtual machines include Java virtual machines (JVMs); and the one or more second virtual machines include JVMs.

16. A non-transitory machine-readable storage medium comprising a first plurality of machine-readable instructions which when executed by one or more processors associated with one or more computing systems are adapted to cause the one or more processors to perform a method comprising:
    detecting debug events occurring in one or more first virtual machines;
    storing debug records, each of the debug records including information associated with a respective debug event selected from the debug events and a timestamp associated with the respective debug event;
    merging the debug records based on information associated with each timestamp;
    starting one or more second virtual machines, each of the one or more second virtual machines emulating a selected one of the one or more first virtual machines;
    synchronizing the one or more second virtual machines;
    retrieving the merged debug records; and
    playing the merged debug records back in chronological order on the one or more second virtual machines.

17. The non-transitory machine-readable storage medium of claim 16, further comprising a second plurality of machine-readable instructions which when executed by the one or more processors associated with the one or more computer systems are adapted to cause the one or more processors to perform a method comprising collecting clock synchronization records.

18. The non-transitory machine-readable storage medium of claim 17 wherein merging the debug records comprises altering an order of one or more of the debug records based on information associated with the clock synchronization records.

19. A system for cluster debugging, the system comprising:
    a cluster comprising a plurality of nodes coupled together using a network;
    a database coupled to the network; and
    a debugging workstation coupled to the network;
    wherein:
        each of the plurality of nodes executes one or more first virtual machines and a debugging database extension (DDE);
        debug events occurring in each of the one or more first virtual machines are detected;

the database stores debug records;

each of the debug records includes information associated with a respective debug event selected from the debug events and a timestamp associated with the respective debug event;

the stored debug records are merged based on information associated with each timestamp;

the debugging workstation executes a playback module and one or more second virtual machines;

each of the one or more second virtual machines emulates a selected one of the one or more first virtual machines;

the one or more second virtual machines are synchronized; and the playback module retrieves the merged debug records and plays the merged debug records back in chronological order on the one or more second virtual machines.

20. The system of claim 19 wherein:

the plurality of nodes exchange clock synchronization messages to generate clock synchronization records; and the debug records are merged based on information associated with the timestamp included in each of the debug records and information associated with the clock synchronization records.

* * * * *